G. SCHNURR.
LOCOMOTIVE SCALE.
APPLICATION FILED AUG. 14, 1919.
1,338,593.
Patented Apr. 27, 1920.
4 SHEETS—SHEET 1.
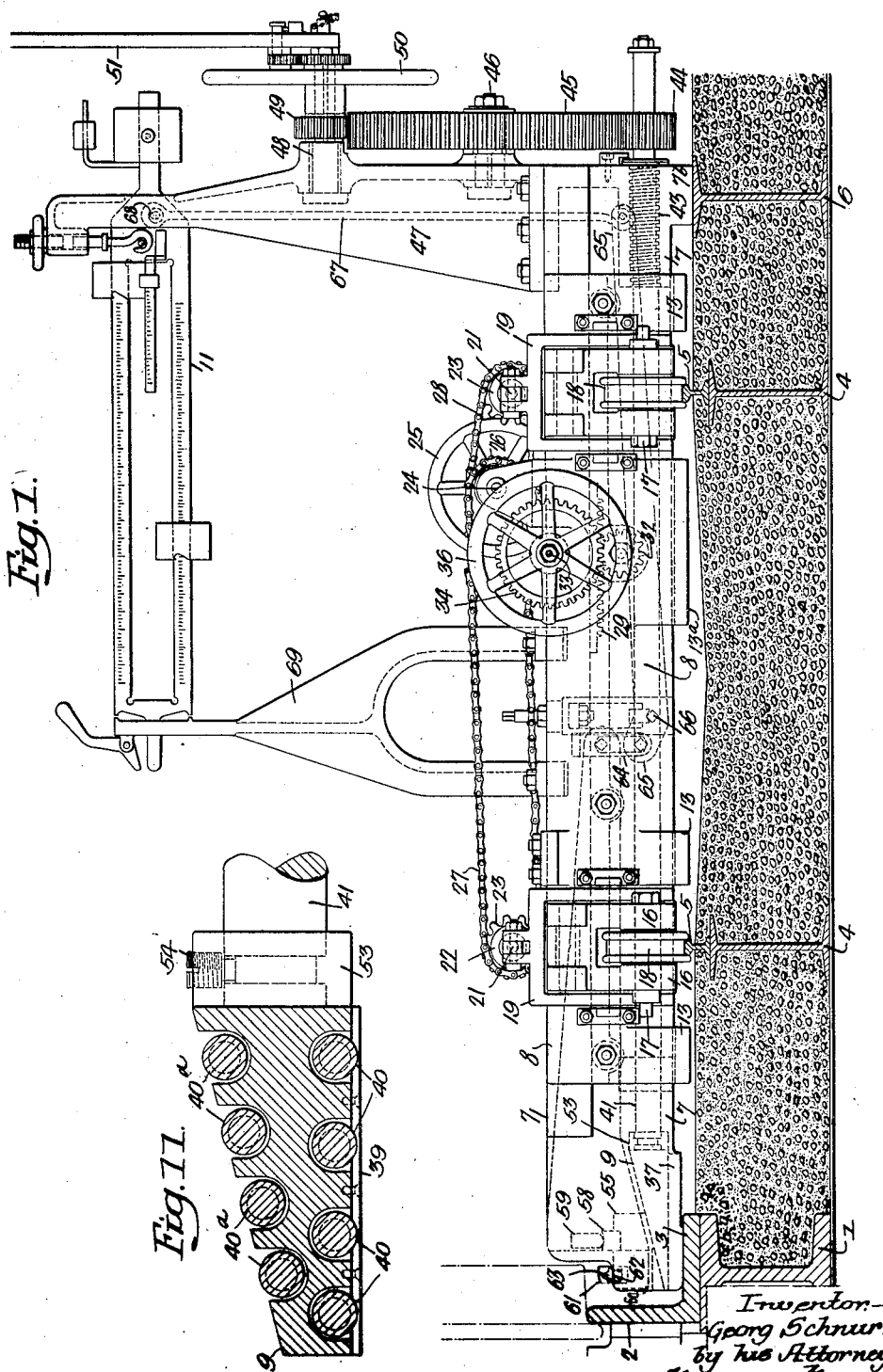

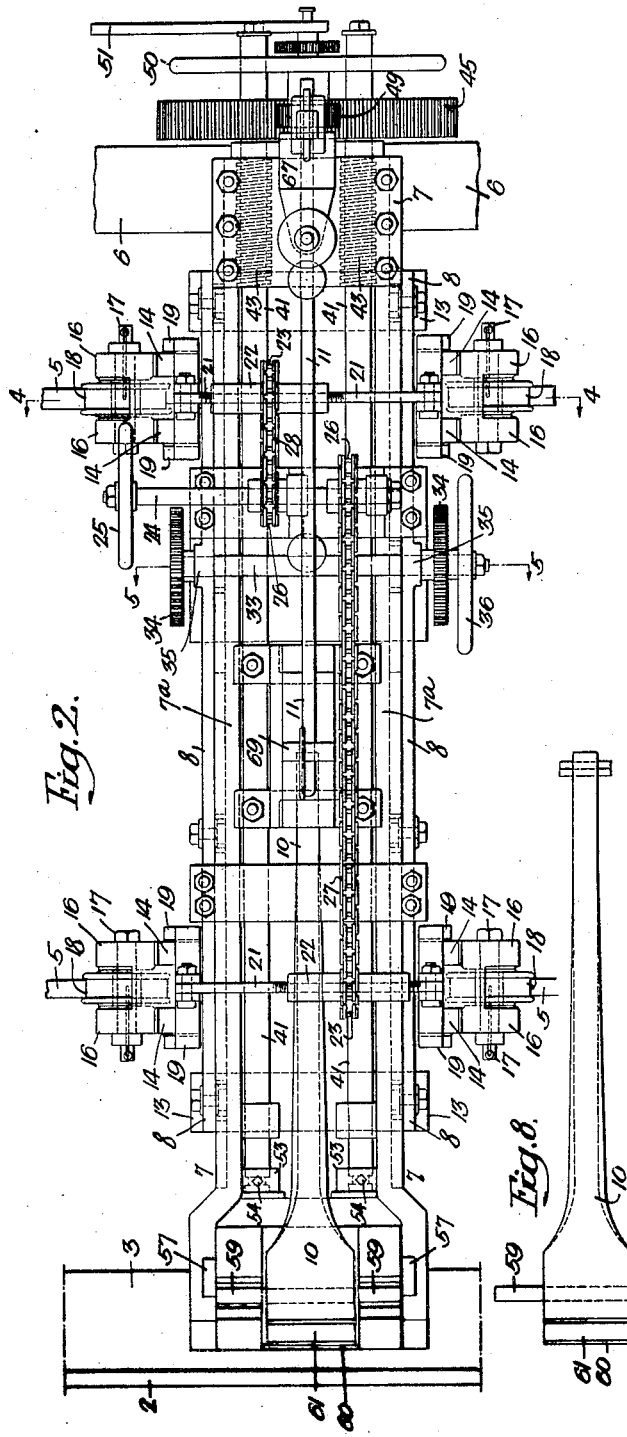

G. SCHNURR.
LOCOMOTIVE SCALE.
APPLICATION FILED AUG. 14, 1919.
1,338,593.
Patented Apr. 27, 1920.
4 SHEETS—SHEET 3.
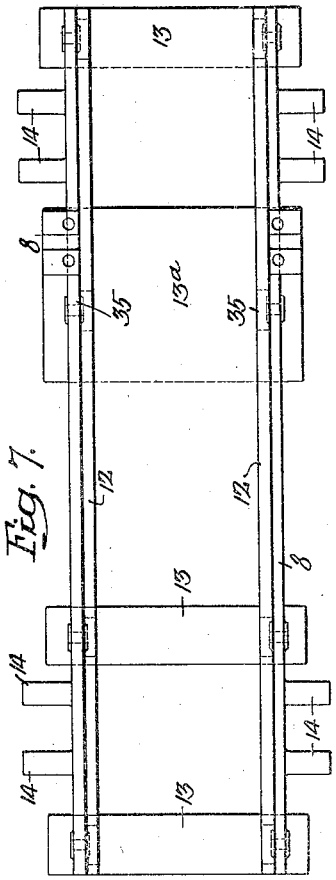
Fig. 7.
Fig. 4.
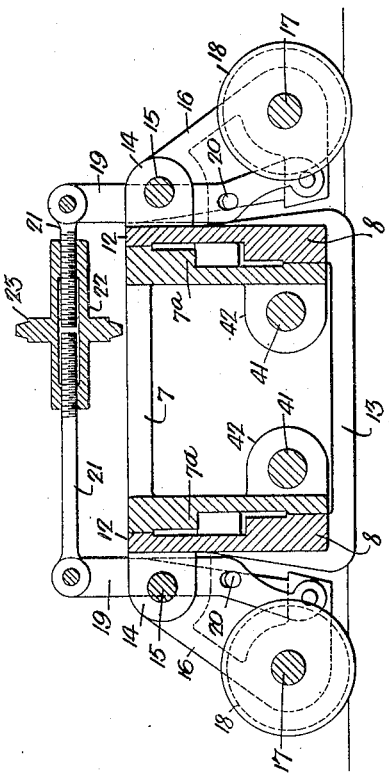
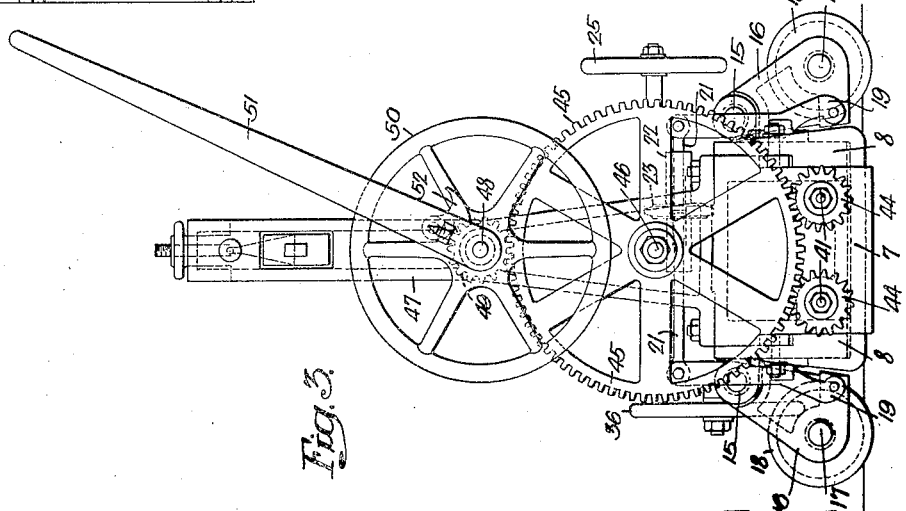
Fig. 3.
Inventor—
Georg Schnurr.
by his Attorneys.

G. SCHNURR.
LOCOMOTIVE SCALE.
APPLICATION FILED AUG. 14, 1919.
1,338,593.
Patented Apr. 27, 1920.
4 SHEETS—SHEET 4.
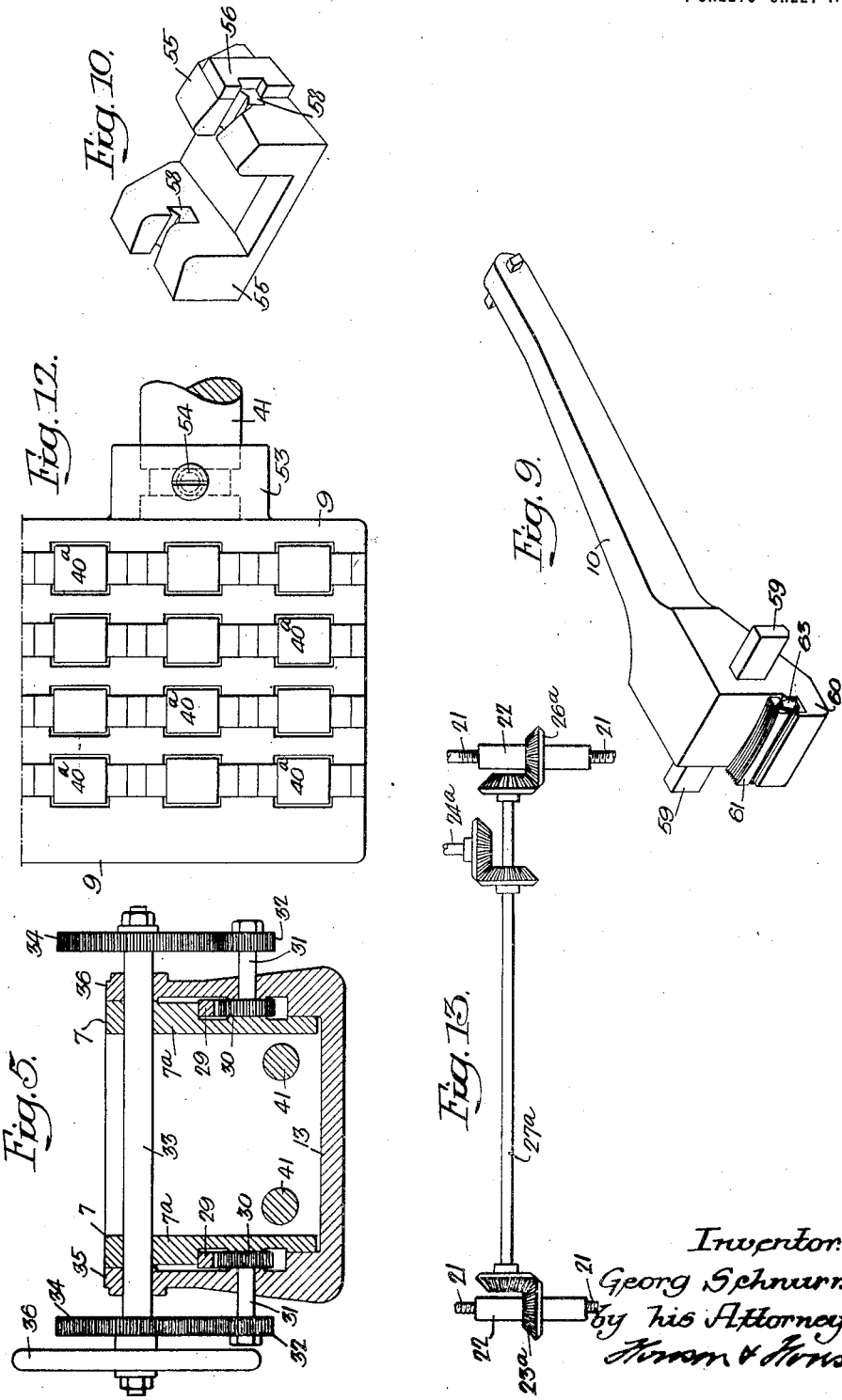

UNITED STATES PATENT OFFICE.

GEORG SCHNURR, OF PHILADELPHIA, PENNSYLVANIA.

LOCOMOTIVE-SCALE.

1,338,593.  Specification of Letters Patent.  Patented Apr. 27, 1920.

Application filed August 14, 1919. Serial No. 317,412.

*To all whom it may concern:*

Be it known that I, GEORG SCHNURR, a citizen of the Republic of Switzerland, and a resident of Philadelphia, county of Philadelphia, State of Pennsylvania, have invented certain Improvements in Locomotive-Scales, of which the following is a specification.

One object of this invention is to provide scales for weighing locomotives.

Another object of this invention is to design the scale so that one complete scale is used for each driving wheel of the locomotive.

Still another object of the invention is to use a heavy angle beam for supporting the wheels of a locomotive so that they will have considerable overhang, the beam also supporting one end of the scale structure.

A further object of the invention is to provide means for adjusting the bearing wheels and also to provide means for raising the locomotive on the scale beam.

The invention also relates to certain details which will be fully described hereinafter.

In the accompanying drawings:

Figure 1 is a side view of a locomotive scale illustrating my invention;

Fig. 2 is a plan view;

Fig. 3 is an end view;

Fig. 4 is a sectional view on the line 4—4, Fig. 2;

Fig. 5 is a transverse sectional view on the line 5—5, Fig. 2;

Fig. 6 is a plan view of the supporting frame;

Fig. 7 is a plan view of the carrying frame;

Fig. 8 is a plan view of the balance lever;

Fig. 9 is a perspective view of the balance lever;

Fig. 10 is a perspective view of the wedge block on which the balance lever is pivoted.

Fig. 11 is a sectional view through the wedge;

Fig. 12 is a plan view of the wedge; and

Fig. 13 is a view of a modification of the means for operating the trucks.

Referring to the drawings, 1 is a supporting beam. 2 is a heavy angle beam mounted on the supporting beams. The upper, narrow edge forms the track on which the locomotive is supported. There is one of these beams on each side of the track structure and it will be understood that instead of the single intricate locomotive scale, which supports the entire locomotive, the present construction is used. Each scale is a unit and each unit supports its portion of a locomotive through a driving wheel if, for instance, the locomotive has six driving wheels then there are six scales, one for each driving wheel. The base portion 3 of the angle beam is of sufficient width to act as a support for the projecting portion of the supporting frame of the scale structure.

4, 4 are beams mounted in a suitable foundation on which are rails 5 which support the scale structure, allowing it to be moved longitudinally. 6 is a beam, which is the abutment for the rear end of the supporting frame 7. When the scale is in action, the forward end is supported on the portion 3 of the angle beam, as hereinbefore mentioned.

The scale structure consists essentially of the supporting frame 7, the carrying frame 8, the wedge 9 and its mechanism, and the balance lever 10, which is connected to the beam 11 of the scale. The beam structure is of any of the ordinary types used for weighing heavy machinery.

The carrying frame 8 consists of two longitudinal beams 12 connected at the bottom by depressed cross bars 13 and a depressed plate 13ª. The beams 12 have projecting bearings 14, for the pivot pins 15, which are mounted on trucks, 16, through which extend the axles, 17, for the wheels, 18. These wheels are double flanged, as shown, and are mounted on the trucks, 5, the flanges holding the truck structure against longitudinal movement.

In order to allow the scale beam structure to be lowered so as to rest on the foundation when weighing a locomotive, I connect levers, 19, to the lower portions of the truck, 16, the levers being pivoted at 20, to the frame, as shown in Fig. 4. The upper arms of the levers 19 are connected by rods 21, which have screw threads and adapted to the screw threads is a turn buckle, 22, on which is a sprocket wheel 23. 24 is an operating shaft having a hand wheel, 25. On this shaft are two sprocket wheels 26. A chain, 27, extends around the sprocket wheels, 23, at the forward end of the structure and around one of the wheels, 26, on the shaft 24. Another chain, 28, passes around the sprocket wheel, 26, and around the sprocket wheel, 23, of the rear structure so that on turning the hand wheel 25, the four trucks, 16, are operated in unison. When the wheel is turned in one direction, the scale structure is lowered onto the supporting base and when turned in the opposite direction the structure is raised off of the base and will be supported by the wheels 18. It can be shifted to any point desired.

In order to move the supporting frame longitudinally on the carrying frame so as to bring it into and out of position, I mount on the under side of the side members 7ª of the supporting frame, racks 29 with which mesh the pinions 30 on shafts 31 on which are mounted the pinions 32. On an operating shaft, 33, are gear wheels, 34, which mesh with the pinions 32. This operating shaft 33 is mounted in bearings 35 on the carrying frame 8. On the end of this shaft 33 is a hand wheel, 36, by which the shaft is turned so that on turning the shaft the supporting frame can be moved longitudinally on the carrying frame. Mounted at the forward end of the supporting structure is a wedge 9. This wedge rests upon a base, 37, forming part of the supporting frame. This base is grooved, as at 38. The wedge has tongues, 39, adapted to the grooves, 38. In order to allow the wedge to move freely, I provide narrow rollers, 40, which rest in the spaces between the grooves 38 of the supporting base 37, and I also mount rollers 40ª on the upper side of the wedge as shown. In some instances the rollers may be dispensed with and a plain wedge may be used instead of one having rollers or ribs. The wedge is moved longitudinally by means of two rods, 41, which are adapted to bearings, 42, on the supporting frame 7, and are screw threaded at their rear ends 43. These threads are adapted to threaded openings in the rear portion 7ᵇ of the supporting structure. On each screw rod is a pinion, 44, meshing with a gear wheel, 45, on a stud, 46, carried by an upright, 47, secured to the rear end of the supporting frame 7. Mounted on a shaft, 48, on this upright is a pinion, 49, which meshes with the gear wheel, 45, and also on this shaft is a hand wheel, 50. In the present instance, I have shown an operating lever, 51, pivotally mounted on the end of the shaft 48, and having a pawl, 52, which locks the lever to the shaft so that the shaft will move with the lever.

The rods are free to turn in the projections, 53, at the rear of the wedge. The wedge is held to these rods by a set screw, 54, which is adapted to an annular groove in the rods so that the wedge will be positively moved in either direction on the movement of the wheel 45. Resting upon the wedge 9 is a block, 55, Fig. 10 which has projections 56, one at each side adapted to ways, 57, in the supporting frame 7 so that while it can be raised and lowered by the wedge it cannot move longitudinally of the frame. The under side of this block is beveled to correspond to the bevel of the wedge. Located in slots in the block are hard metal bearings, 58, each having a V-shaped groove in the upper surface to fit the knife edge projections, 59, of the balance lever 10, Fig. 9, the balance lever fitting in the block, as shown in Fig. 2. The outer end of this balance lever has a projection, 60, which carries the curved bearing block, 61, which is mounted on the knife edge 62 of the portion 60, and is slightly curved on the under side, as shown, while the upper side is curved longitudinally to conform to the tread of the wheel. There is a series of small teeth cut in this bearing face, which engage the wheel and hold the block rigidly to the wheel. The bearing block is loosely connected to the portion 60 of the balance lever by straps or bolts, 63. These, however, do not interfere with the free movement of the parts while the locomotive is being weighed.

It will be noticed that the block, 55, and the curved bearing block, 61, are directly above the portion 3 of the angle plate. This curved bearing block engages the overhanging portion of the tread of the wheel so that when the wedge is pushed forward by turning the hand wheel 50, or by operating the lever 51, the curved bearing block is raised into engagement with the tread of the wheel and on continuing the movement the wheel is lifted off of its rail 2. The balance lever is connected at its outer end by links, 64, with a beam, 65, pivoted at 66, and connected at its rear end with the rod 67 leading to the scale beam 11 pivoted at 68 to the upright 47. The edges of this scale beam are similar to those of an ordinary scale and need not be described in detail with the exception that the outer end of the beam 11 is adapted to an upright guide, 69, secured to the frame of the machine.

While I have illustrated a chain gearing for imparting motion to the two trucks 16, a spur gearing may be used, as shown in Fig. 13, in which the shaft 24ª is geared to a longitudinal shaft 27ª. This shaft is in turn geared to the bevel wheels 23ª and 26ª respectively, which have elongated hubs threaded to receive the threaded rods 21 and 22.

The operation is as follows: If, for instance, a locomotive having six driving wheels is to be weighed, then six of these scales are used, three on each side, the balance levers being projected under the wheels with the blocks 61 directly under the overhanging tread of the wheels. Then the trucks, 16, are operated so as to allow the supporting frame to rest directly on the portion 3 of the angle rail and upon the beam 6. Thus this supporting plate is fixed firmly in position. The wedge is forced forward, lifting the block 55 and with it the outer end of the balance lever so that the curved block 61 comes in contact with the tread of the wheel. Then the parts are in position for the adjustment of the weights on the scale beam so as to balance the locomotive and when the balance levers of all of the scales are in the mid position, then the locomotive is entirely supported by the scales and by reading the graduations on the several beams the proper weight is attained.

The difference between the several scale units at the different driving wheels can be readily ascertained.

While my invention is especially adapted for weighing locomotives, it will be understood that it can be used for weighing other machines as well, particularly where certain portions of the machine balance other portions.

I claim:

1. The combination in scales, of a carrying frame mounted on wheels; a supporting frame mounted in the carrying frame; a wedge carried by the supporting frame; means for projecting the wedge; a block mounted on the wedge, a balance lever pivotally mounted on the block; a scale beam connected to the balance lever, the balance lever having a portion adapted to extend under the element to be weighed.

2. The combination of a carrying frame; a supporting frame mounted in the carrying frame; trucks pivotally mounted on the carrying frame; wheels on the trucks adapted to rails; means for raising and lowering the wheels; and a support for the supporting frame when in the weighing position; a wedge; means for operating the wedge; a block mounted above the wedge; a balance lever pivotally mounted on the block and having a projecting portion adapted to engage the element to be weighed; and a scale beam connected to the balance lever.

3. The combination in scales of a carrying frame; trucks pivotally mounted on the frame; wheels mounted on the trucks and adapted to rails; a supporting frame mounted within the carrying frame; means for moving the trucks so as to allow the supporting frame to settle on a fixed foundation during the weighing operation; a wedge mounted on the forward end of the supporting frame; a screw rod adapted to actuate the wedge; and means at the rear end of the scales for turning the screw rod; a block mounted above the wedge; a balance lever pivotally mounted on the block and having a projecting portion arranged to engage the object to be weighed; and a scale beam connected to the balance lever.

4. The combination of a carrying frame; wheels mounted on the carrying frame; means for raising and lowering the wheels relative to the carrying frame; a supporting frame mounted on the carrying frame and arranged to be lowered so as to allow the supporting frame to rest on a fixed foundation while the machine is weighing; a block mounted at the forward end of the supporting frame; means for raising and lowering the block; a balance lever pivoted to the block and having a portion adapted to engage the element to be weighed; and a scale beam connected to the balance lever.

5. The combination in locomotive scales, of a foundation; an angle bar mounted on the foundation and forming a narrow rail for supporting the wheels of a locomotive and also forming a base for the support of the outer end of the scale structure; a carrying frame; wheels mounted on the carrying frame and adapted to rails in the foundation so that the scales can be moved longitudinally in respect to the angle rail; a supporting frame; fixed bearings in the foundation for the rear end of the supporting frame, the front end of the frame resting on the horizontal portion of the angle rail; and means for raising and lowering the wheels of the carrying frame so that the supporting frame can be lowered to rest on its foundation.

6. The combination in a locomotive scale, of a foundation having an angle rail for supporting the wheels, the said angle rail being narrow so as to allow the tread of the wheel to have a considerable overhang; a carrying frame; a supporting frame mounted in the carrying frame and having a forward portion resting under the tread of the wheel; a wedge; means for operating the wedge; a block mounted on the wedge; and a balance lever pivotally mounted on the block and having a projection extending under the tread of the wheel; and a scale beam connected to the balance lever.

7. The combination in locomotive scales, of means for supporting the wheels of a locomotive so that the treads will overhang; a carrying frame; wheels adjustably mounted on the frame so as to raise and lower the frame; a supporting frame mounted on the carrying frame; a wedge resting on the supporting frame at its forward end; a rod extending to the rear of the machine and having a threaded portion; means for turning the rod so as to project the wedge; a block mounted on the wedge and guided in the supporting frame; a balance lever pivotally mounted on the block and having an extension resting under the tread of the wheel; a knife edge on the extension; a curved block mounted on the knife edge and arranged to engage the tread of the wheel; and weighing mechanism connected to the balance lever.

8. The combination in locomotive scales, of a narrow rail for supporting the wheels of a locomotive; a base on which the scale structure rests when in the weighing position; a carrying frame; a supporting frame mounted on the carrying frame; a wedge mounted at the forward end of the supporting frame; two screw rods extending longitudinally of the machine and adapted to threaded openings at the rear of the machine; pinions on the rods; a gear wheel meshing with both pinions; means for turning the gear wheel so that both rods will be turned in unison to move the wedge longitudinally; a block mounted on the wedge and guided in the supporting frame; a balance lever pivotally mounted on the block and having a portion adapted to engage the wheel; and weighing mechanism connected to the balance lever.

9. The combination of a base; an angle rail having a portion mounted on the base and having an upright projecting portion forming a rail on which the locomotive wheels are mounted; a carrying frame; adjustable wheels mounted on the carrying frame and adapted to travel on tracks mounted on the base so that the scales can be moved laterally; a supporting frame mounted on the carrying frame and having a portion adapted to rest on the base portion of the angle rail and also to rest on the foundation at the rear; a wedge; means for operating the wedge; a bearing block adapted to guides in the supporting frame and mounted above the wedge; a balance lever pivotally mounted on the block and having a projection extending under the overhanging tread of the wheel; and weighing mechanism connected to the lever.

10. The combination in scales, of a supporting frame having vertical guides; a wedge mounted on the supporting frame; means for operating the wedge, said wedge having a series of anti-friction rollers on its upper and lower surface; a bearing block adapted to vertical guides in the supporting frame and resting on the upper rollers of the wedge; a balance lever pivotally mounted on the block; and weighing mechanism connected to the balance lever.

11. The combination in locomotive scales, of a supporting frame adapted to be mounted in a foundation having a series of parallel grooves at the forward end; a wedge having ribs adapted to the grooves, means for moving the wedge longitudinally; vertical guideways in the supporting frame; a carrying block mounted in the guideways and resting on the wedge; a balance lever pivotally mounted on the block and having a projecting portion adapted to extend under the tread of the wheel; and weighing mechanism connected to the said lever.

12. The combination in locomotive scales, of a carrying frame; trucks pivotally mounted on each side of the carrying frame; wheels mounted on the trucks; levers pivoted to the carrying frame, one arm of each lever engaging threaded rods connected to the other arms of the lever; a hub engaging the rods; and means for turning the hub so as to move the levers and trucks.

13. The combination in scales, of a carrying frame; two sets of trucks spaced apart; wheels on the trucks; levers for operating the trucks; screw rods connected to the levers; a sprocket wheel having an elongated hub and adapted to the rods of opposite trucks; an operating shaft having sprocket wheels; chains passing around the sprocket wheels of the operating shaft and around one of the first mentioned sprocket wheels; a chain passing around the other sprocket wheel on the operating shaft and around the first mentioned sprocket wheel so that on turning the operating shaft the trucks will be moved in unison.

14. The combination in scales, of a carrying frame; a supporting frame mounted on the carrying frame; racks on the supporting frame; pinions on the carrying frame meshing with the said racks; an operating shaft geared to the pinions so that on turning the shaft the supporting frame can be moved longitudinally in the carrying frame; and weighing mechanism mounted on the supporting frame.

15. The combination in locomotive scales, of a supporting frame; a wedge mounted on said frame; means for moving the wedge; a block supported by the wedge; a balance lever pivotally mounted on the block and having a projection at the forward end provided with a knife edge; a curved block mounted on the knife edge and arranged to engage the tread of a wheel; means connecting the curved block to the projection of the balance lever; and weighing mechanism connected to the balance lever.

GEORG SCHNURR.